United States Patent
Straathof et al.

[19]

[11] Patent Number: 6,167,534
[45] Date of Patent: Dec. 26, 2000

[54] LOAD TEST SYSTEM AND METHOD

[75] Inventors: Jeffrey A. Straathof, Bethesda, Md.; Joel L. Sherriff, Manassas, Va.; Dawn C. Maurer, Centreville, Va.; Ramendra S. Chhina, Arlington, Va.

[73] Assignee: Rational Software Corporation, Cupertino, Calif.

[21] Appl. No.: 08/577,278

[22] Filed: Dec. 22, 1995

Related U.S. Application Data

[60] Provisional application No. 60/007,590, Nov. 24, 1995.

[51] Int. Cl.$^7$ ..................................................... G06F 11/00
[52] U.S. Cl. ............................................................... 714/38
[58] Field of Search .................................... 395/701, 704, 395/500, 527, 183.14, 184.01, 183.09, 500.47; 364/551.01; 714/38, 47, 33, 28, 32; 702/119, 123, 186

[56] References Cited

U.S. PATENT DOCUMENTS

| | | | |
|---|---|---|---|
| 5,086,393 | 2/1992 | Kerr et al. ........................ | 364/551.01 |
| 5,440,697 | 8/1995 | Boegel et al. ...................... | 395/500 |
| 5,630,049 | 5/1997 | Cardoza et al. .................... | 714/25 |
| 5,758,062 | 5/1998 | McMahon et al. ................. | 714/38 |
| 5,896,535 | 4/1999 | Ronstrom et al. .................. | 702/123 |

OTHER PUBLICATIONS

Freeman, "The Computer Desktop Encyclopedia", pp. 25, 99, 807, 808.

*Primary Examiner*—Robert W. Beausoliel, Jr.
*Assistant Examiner*—Pierre J. Glisea
*Attorney, Agent, or Firm*—Ritter, Van Pelt & Yi LLP

[57] ABSTRACT

An improved system and method for load testing software applications is provided. The user interface and/or application calls are captured to generate a script to emulate a user session. The script may include source language statements and, with or without editing, may be compiled into an executable script. Multiple scripts may be executed on a script driver to simulate multiple users to load test a system.

30 Claims, 13 Drawing Sheets

Microfiche Appendix Included
(21 Microfiche, 1319 Pages)

LOAD TEST SYSTEM AND METHOD

This application claims priority of provisional U.S. patent Ser. No. 60/007,590, filed Nov. 24, 1995.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

MICROFICHE APPENDIX

A microfiche appendix of source code including one thousand three hundred nineteen (1319) frames on twenty one (21) sheets is included herewith.

BACKGROUND OF THE INVENTION

The present invention relates to the field of software systems. More specifically, in one embodiment the invention provides an improved method of load testing software and, especially, a system and method for scripting user actions for a load test.

There are a number of different approaches to load testing. For example, live users may be utilized. The system developer hires live users and buys the hardware required (PCs or terminals) to drive the system. This approach, however, is very expensive. In order to cut costs, someone considering this approach usually decides to test using some fraction of the actual number of users that the actual system will be required to support, and to interpolate actual response time figures based on the response time of the fraction. This method fails largely due to inadequate testing of threshold conditions. Also, even if the entire number of proposed users can be seated and instructed to perform the test actions, it will be impossible to control their rates of input or accurately measure the response times.

Simulations have also been used. The developer computes the theoretical load imposed upon the system and interpolates the response times and theoretical number of users that the system may support. This method has very little basis in reality and provides no confidence that its assumptions are correct or its results accurate.

Canned benchmarks may also be utilized. A number of publicly available benchmark tests are available that exercise a piece of hardware and the operating system that runs it, but this does not allow for the testing of a particular application.

From the above it is seen that an improved system and method for load testing software applications are needed.

SUMMARY OF THE INVENTION

An improved system and method for load testing software applications is provided by virtue of the present invention. The system interjects a Capture Agent that may capture or intercept user interface and application calls in order to generate a higher-level script. The script, along with other scripts, may be compiled and executed to simulate multiple users to load test software applications.

In one embodiment, a method of producing scripts for load testing a software application in a client/server environment, includes the steps of: capturing application calls on the client computer, the application calls including application calls generated in response to the captured user interface calls; recording timing information of the captured application calls; and generating a script from the captured application calls that generates application calls according to the timing information of the captured application calls. Additionally, user interface calls and associated timing information may be captured and incorporated into the script.

In another embodiment, a method of producing scripts for load testing a software application in a client/server environment, includes the steps of: capturing application calls on the client computer, the captured application calls including references to data stored locally on the client computer; identifying in the captured application calls references to data stored locally on the client computer; accessing the data through the references in the captured application calls; and generating a script from the captured application calls that generates application calls that include the accessed data in place of the references in the captured application calls, the script including the accessed data.

In another embodiment, a method of producing scripts for load testing a software application in a client/server environment, includes the steps of: capturing application calls on the client computer, the captured application calls specifying information to be sent to the server computer; translating the captured application calls into source language statements; and generating a script including the source language statements that generates application calls. Additionally, the script may be user edited or compiled to produce an executable load test program.

In another embodiment, a method of for load testing a software application in a networked computer system having a first computer (script driver) and a second computer (system under test), includes the steps of: the first computer executing scripts that emulate a plurality of users, the scripts including delays representative of actual user sessions; the first computer sending requests to the second computer over a network; the second computer responding to the requests over the network; and measuring response times of the second computer. Additionally, a third computer may be on the network to display a script directed user session in progress.

A further understanding of the nature and advantages of the inventions herein may be realized by reference to the remaining portions of the specification and the attached drawings.

DETAILED DESCRIPTION OF PREFERRED EMBODIMENTS

Definitions

System—a combination of software and the hardware it runs on.

Load Testing—the process of analyzing the effect of many users on a system.

Response Time—the time between a user-initiated request and the response from the system to that request.

Client/Server—a computer architecture where a networked server computer services client computers that are intelligent, programmable devices.

Load Testing is an essential step in the application development process. It allows a developer or systems integrator to determine the performance and scalability of a system prior to the deployment of the system by measuring the user-perceived response time. The present invention utilizes user emulation to load test software applications. This process emulates live users by performing the activities of the actual users, preferably in a manner such that the actual system cannot differentiate between the emulated users and the actual users.

Figure 1:
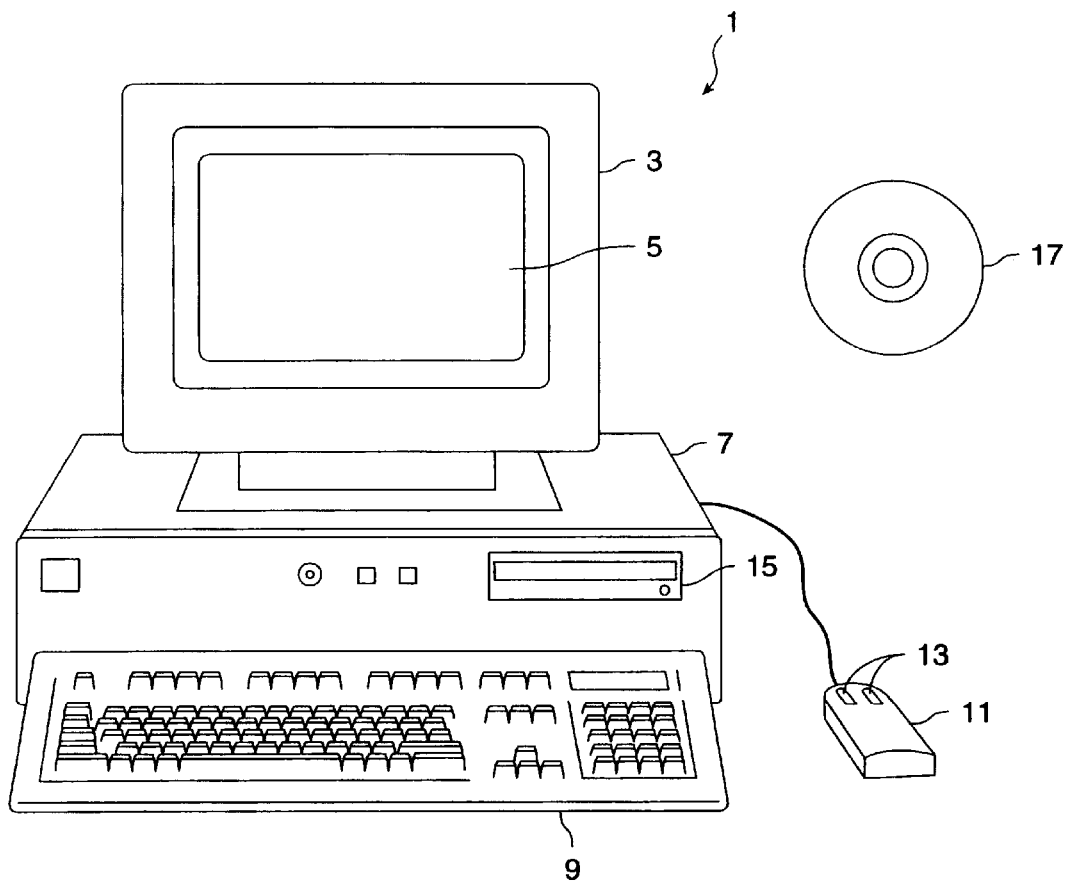
FIG. 1 is a prior art that illustrated an example of a computer system that may be used to execute software of the present invention.

FIG. 1 illustrates an example of a computer system that may be used to execute software of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15 or a hard drive (not shown) which may be utilized to store and retrieve software programs incorporating the present invention, data for use with the present invention, and the like. Although a CD-ROM 17 is shown as the removable media, other removable tangible media including floppy disks, tape, and flash memory may be utilized. Cabinet 7 also houses familiar computer components (not shown) such as a processor, memory, and the like.

Figure 2:
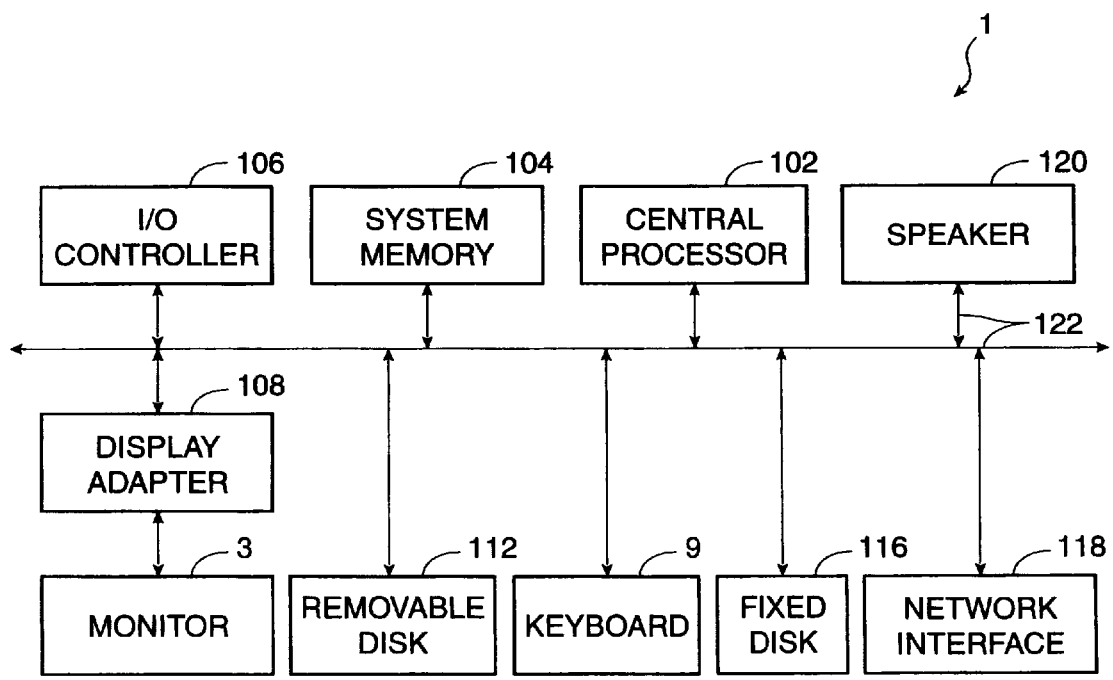
FIG. 2 is a prior art that showed a system block diagram of a typical computer system.

FIG. 2 shows a system block diagram of a typical computer system. As in FIG. 1, computer system 1 includes monitor 3 and keyboard 9. Computer system 1 further includes subsystems such as a central processor 102, system memory 104, I/O controller 106, display adapter 108, removable disk 112, fixed disk 116, network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for user with the present invention. Other configurations of subsystems suitable for use with the present invention will be readily apparent to one of ordinary skill in the art.

Figure 3:
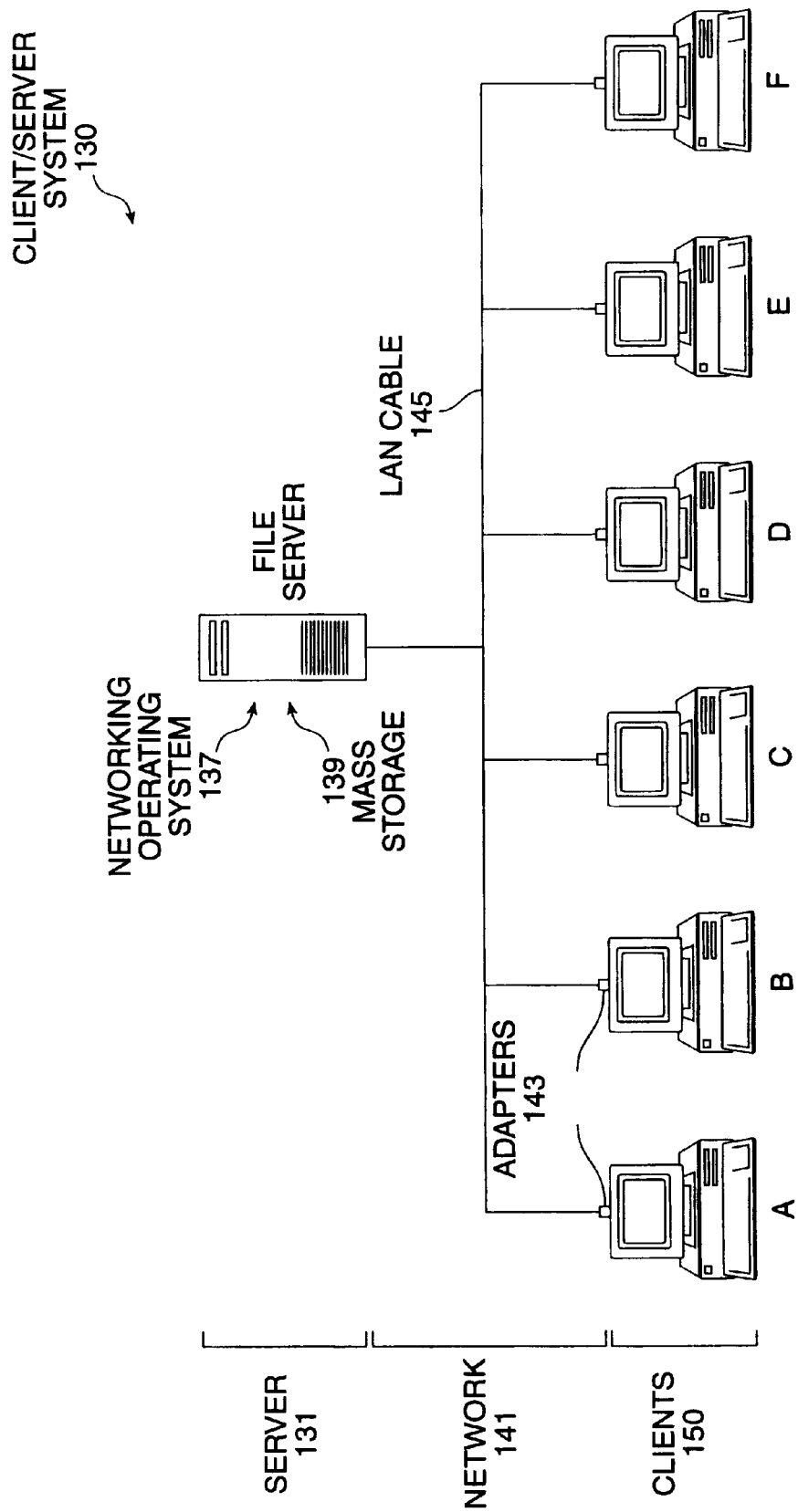
FIG. 3 is a prior art that illustrated a client/server architecture.

FIG. 3 illustrates a client/server architecture. A client/server system 130 includes a first computer or server 131 and one or more second computers or clients 150. Typically, the clients 150 are connected to server 131 through a computer network 141, which may be a conventional Local Area Network (LAN). Network 141 includes cabling 145 for connecting the server and each client to the network. The clients themselves may be similar to or the same as computer system 1. Each client typically includes a network connector or adapter 143 for receiving the network cable 145, as is known in the art. Server 131 may also be similar to or the same as computer system 1. Because the server manages multiple resources for the clients, it should preferably include a relatively faster processor, larger mass storage, and more system memory than is found on each client.

Overall operation of the system 130 is directed by a networking operating system 137, which may be stored in the server's system memory. In response to requests from the clients 150, the server 131 provides various network resources and services. For instance, multiple users (e.g., clients A, B and C) may view a database table stored in file server storage 139, while another user (e.g., client E) adds a database record.

The following description will focus on a preferred embodiment of the present invention, where the client computers are IBM compatible computers running Windows 3.1 and the script driver is a UNIX workstation (e.g., from Sun Microsystems, Inc.). The server provides database functions for a database application like those available from Oracle Corporation or Sybase, Inc. The network operating system that provides network communication may be from a vendor such as Novell.

The present invention, however, is not limited to any particular application or any particular environment. Instead, those skilled in the art will find that the teachings of the present invention may be advantageously applied to a variety of other applications including spreadsheet applications, word processors, and the like. Moreover, the present invention may be embodied on a variety of different platforms, including Macintosh, NextStep, and the like. Therefore, the description that follows is for purposes of illustration and not limitation.

One difficulty encountered in user emulation is the problem is how to develop a test script that accurately represents a user's activities and rates of input to the system being tested. This problem is complicated when the system to be tested is a part of a client/server application, where the client part of the system is located on a personal computer (PC) and the server part on another, usually larger, host.

Systems provided by this invention implement a method of capturing user activities that are part of a client/server system. This method works in a way that accurately records the user's rates of input, client delays caused by local processing of data, and all other inputs necessary to correctly replay and replicate that user's activities to perform a load test. Although the particular implementation is specifically developed to capture particular commercially available database user's activities (e.g., from Oracle Corporation or Sybase, Inc.), it can be modified for another database or for another type of client/server application. It can also be modified for another client side operating system such as OS/2, WINDOWS '95 or WINDOWS NT.

With the invention, a single machine may be used to accurately simulate hundreds of users. The system creates scripts that represent actual users and their daily, often disparate, operations. With the Capture Agent, the system records user activities, including keystrokes, mouse movements and SQL requests, to create emulation scripts. The system then arranges a mix of scripts that represent actual users. The system reveals if a software application or system under test works. Before deployment, one can correct common difficulties that emerge during the application development process. The system may optionally chart the time one waits for screen responses, and may find hidden bugs and bottlenecks.

In a preferred embodiment, the Capture Agent captures Windows and SQL Application Programming Interface (API) calls. These user interface and application calls may be captured or intercepted by an in-memory replacement of API call addresses with Capture Agent function addresses, by a renaming of the API library on disk so that the Capture Agent is called in place of the API library which then calls the renamed library, hooks, or other mechanisms. As will be discussed in reference to FIG. 5, the Capture Agent monitors the API calls and generates a script that encapsulates the calls into a form that may be executed on another host (or script driver). This is unique in that it is not merely a trace of the API calls. The calls to the API are monitored and re-written into a higher-level or source language that allows the data and a representation of the API calls to be recorded into a procedural script that can be compiled and executed. Among other things, this requires references to program variable addresses to be resolved by the Capture Agent and the data referred to to be recorded in the script.

Another unique part of this process is that while the application calls (e.g., SQL API calls) are being monitored, the user interface calls (e.g., WINDOWS API calls) of the operating system are also being monitored so that the user's activities may be recorded. These activities or events include mouse motions, button presses, key presses, as well as user-generated delays. The process differentiates between delays caused by the user (due to a user pause), delays caused by the client-side of the application (due to some internal processing of data, for example), and delays caused by the server-side of the application. Since the goal is to accurately emulate all of the activities of a client, these delays are important to the emulation of the user. Discarding delays caused by the internal processing of data (for example) will cause a higher load to be imposed on the server due to faster arrival times of requests.

Figure 4:
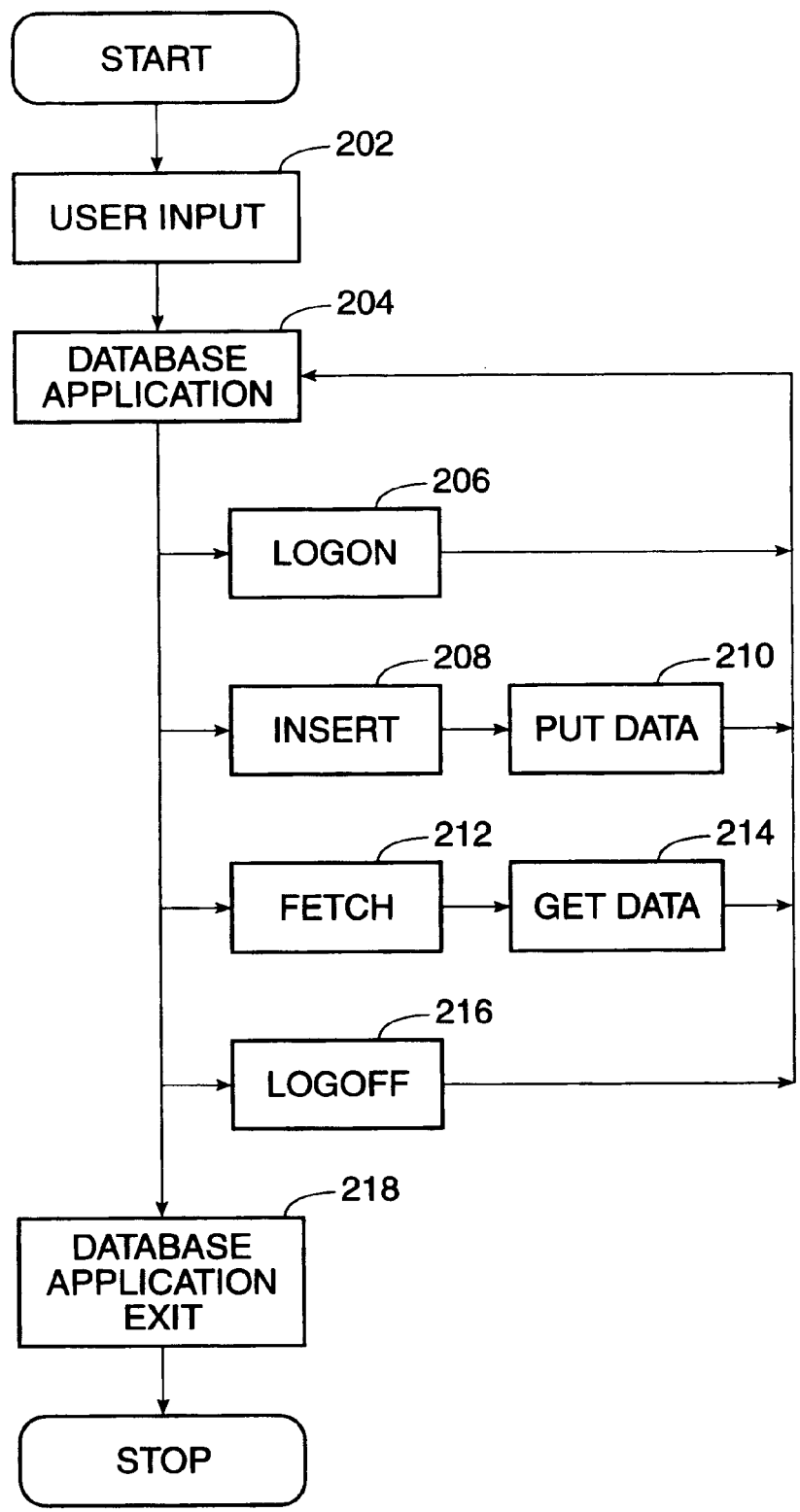
FIG. 4 is a prior art that showed a high level flowchart of a typical database application.

FIG. 4 shows a high level flowchart of a typical database application. The database application may be from such vendors as Oracle Corporation or Sybase, Inc. Although the client/server application described is a database application, other applications may be utilized with the present invention. For example, spreadsheet applications, word processors, or any other client/server application.

Once a database application is running, the system receives user input at step 202. The user input may be any type of user input like typing characters on the keyboard or moving the mouse and "clicking" (depressing a mouse button) on a menu selection in a Graphical User Interface (GUI). The operating system typically receives these user events and make a user interface call to the appropriate application which, in this case, will assumed to be the database application.

At step 204, the database application receives the user interface call from the operating system. The database application then processes the call to determine what action, if any, should be taken. The following describes just a few of the possible user interface calls that may be received. The calls are not intended to be an exhaustive list and may vary from application to application. Nevertheless, the calls are intended to aid the reader's understanding of a typical database application.

At step 206, the database application determined that the user interface call is a request to logon to the database application. A logon typically includes the user's name and a password. The database application then verifies and stores the logon information.

At step 208, the database application received a user interface call requesting to insert data into the database. After the database application verifies the request, the database application makes an application call to put the data in the database at step 210. The application call is sent over the network to the database server.

At step 212, the database application received a user interface call requesting to fetch data from the database. The database application makes an appropriate application call to get the requested data from the database at step 214. The application call is sent over the network to the database server.

At step 216, the database application determined that the user interface call is a request to logoff the database application. After each of the user interface calls, the system receives more user input at step 202 which may be passed on to the database application. However, if the user interface call specifies that the user desires to exit the database application, the database application exits at step 218.

Figure 5:
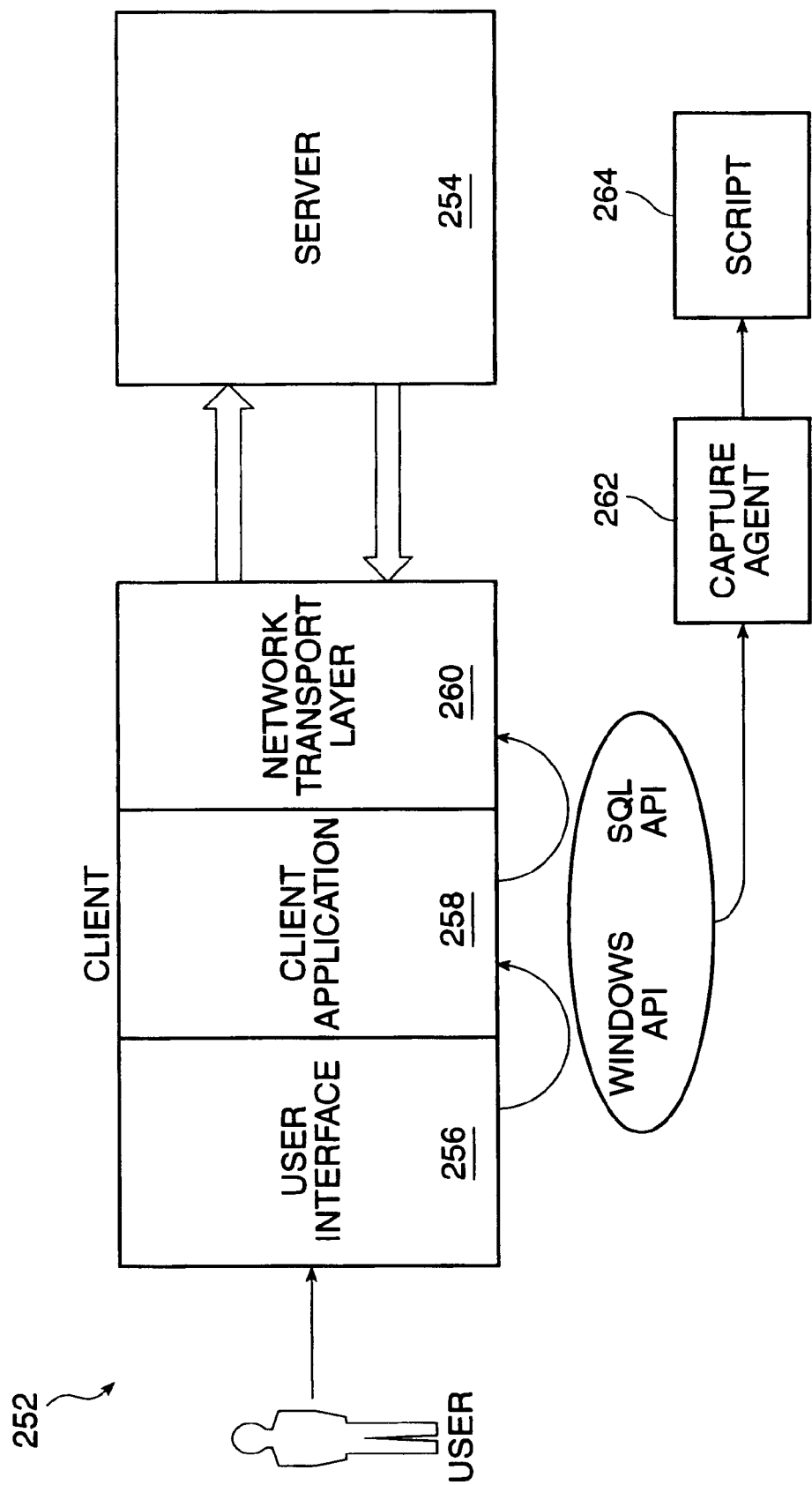
FIG. 5 shows the data flow of one aspect of the invention.

FIG. 5 shows the data flow of one aspect of the invention. A client computer 252 is linked to a server computer 254 over a network. In the embodiment shown, the client is running a WINDOWS operating system and the database application is from Oracle Corporation. A user interacts with the client through a user interface 256, here shown as a WINDOWS user interface. As the user types characters on the keyboard or operates the GUI, these user events generate the appropriate user interface call in the form of a WINDOWS API call to a client application 258. The client application is a front-end for the database application, which is shown as an SQL server. The front-end client application utilizes the processing power of the client computer in order to offload some of the processing required from the database server. Thus, the database application has a client-side application and a server-side application. Typically, the client application is optimized for user interaction and the server application of the database application is optimized for servicing multiple users to take advantage of the client/server architecture.

The client application receives user interface calls and sends the appropriate application calls in the form of an SQL API call to a network transport layer 260. The network transport layer is typically a driver that formats the call for transmission over the network to the server. Similarly, the network transport layer receives data from the server sent to the client.

An important aspect of the present invention is the Capture Agent. A Capture Agent 262 captures one or both of the Windows and SQL API calls during a user session. The Capture Agent not only intercepts the user interface and application calls, the Capture Agent records timing information regarding when the calls were sent. This allows the Capture Agent to generate a script 264 to emulate the user session including the speed in which the user input information and the speed in which the client computer responded locally.

The Capture Agent may intercept user interface and application calls any number of ways known in the art. For example, the WINDOWS API calls are intercepted by a WINDOWS API call "hook" which is provided for this purpose. The SQL API calls may be intercepted by renaming the "real" calls so that the SQL API calls go to the Capture Agent. After the Capture Agent intercepts the SQL calls, the "real" SQL call is then sent so that the user session may continue.

The script emulates a user session by being able to reproduce the user and application delays. This is more comprehensive approach than merely monitoring the network traffic. Preferably, the script is written in a source language meaning a programming language which includes human-readable program statements. This allows the scripts to be more easily edited to vary the captured user session and add control constructs. In a preferred embodiment, the script includes program statements in the C programming language.

Figure 6:
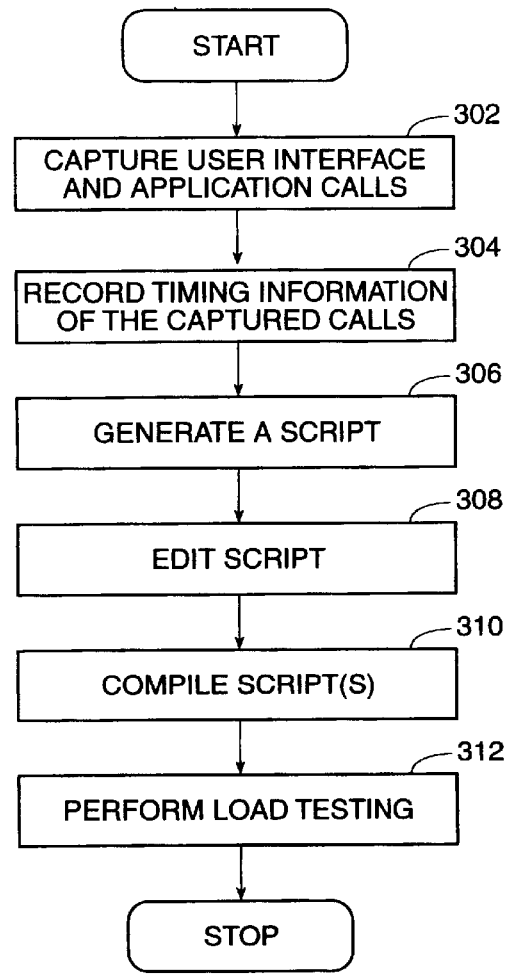
FIG. 6 shows a high level flowchart of load testing.

FIG. 6 shows a high level flowchart of load testing. Many of the steps shown are optional and many of the steps are more thoroughly discussed in the specification that follows. However, this high level flowchart is provided to give an overall view before discussing more detailed aspects of the present invention.

A user session is begun on a client so that the user interface and application calls may be captured at step 302. The calls are captured by the captured agent which records timing information regarding the captured calls at step 304. During or after the user session, a script is generated at step 306 that is capable of directing emulation of the user session. The Capture Agent generates the script which preferably includes source language statements and the timing information of the capture user interface and application calls.

At step 308, the script may be edited. Although this step is optional, it may be useful to edit the script in order to enhance the script (e.g., add loops) or modify the data. For example, if a script of a typical user session that adds a database record is captured, it may be beneficial to edit the script so that the script adds different database records when multiple copies of the script are executing. Thus, if a user session adds a database record for an employee named John Smith, the script may be edited to add a record for an employee from a data file or a random name. In this manner, when the script is utilized to emulate, for example, a hundred users, all one hundred users will not attempt to add the same database record. Not only would this run the risk of causing an error, it would not adequately emulate realistic multiple user sessions.

The script or scripts are compiled at step 310. In a preferred embodiment, the scripts include source language statements and may be compiled into executable programs that emulate user sessions. Load testing may be performed with a single script or with multiple scripts. Typically, however, multiple scripts are utilized to simulate tens or hundreds of users.

At step 312, load testing of an application or system under test is performed utilizing the compiled scripts. The compiled scripts are run by a script driver which is a computer connected to the server over a network similar to or the same as the network that will be utilized to connect the clients to the server in actual operation.

Figure 7:
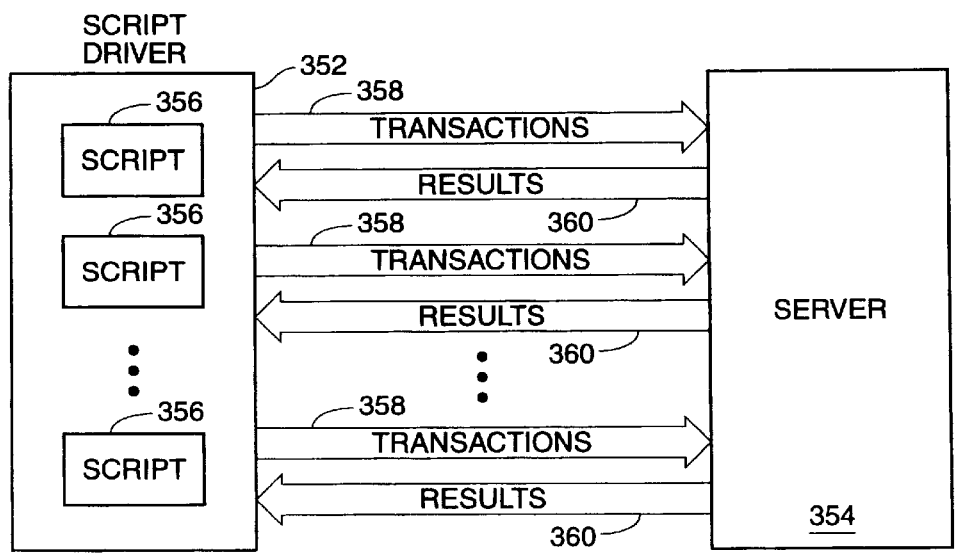
FIG. 7 shows load testing of a system under test.

FIG. 7 shows load testing of a system under test. A script driver 352 is connected to a server 354 by a network. In one embodiment, the script driver is a relatively fast computer, workstation or mainframe running the UNIX operating system. For example, the script driver may be a workstation from Sun Microsystems, Inc. which when running UNIX provides multitasking capabilities which are utilized to emulate multiple user sessions.

The script driver may store multiple compiled scripts 356. The scripts are run on the script driver as multiple processes so that transactions 358 are sent to the server. Because of the timing information in the scripts, the script driver may faithfully emulate the actions of multiple users. Therefore, the server is operating as if multiple users are utilizing the database application from client computers on the network. The server responds by sending results 360 to the script driver in response to the transactions.

Although FIG. 7 shows a minimal system where only a script driver and the system under test are used for load testing, load testing may be performed with any number of client computers on the network "between" the script driver and the server so that the clients display user sessions as they are run. This aspect of the present invention is called "display mode" and will be discussed in more detail in reference to FIGS. 10, 13 and 14.

Figure 8:
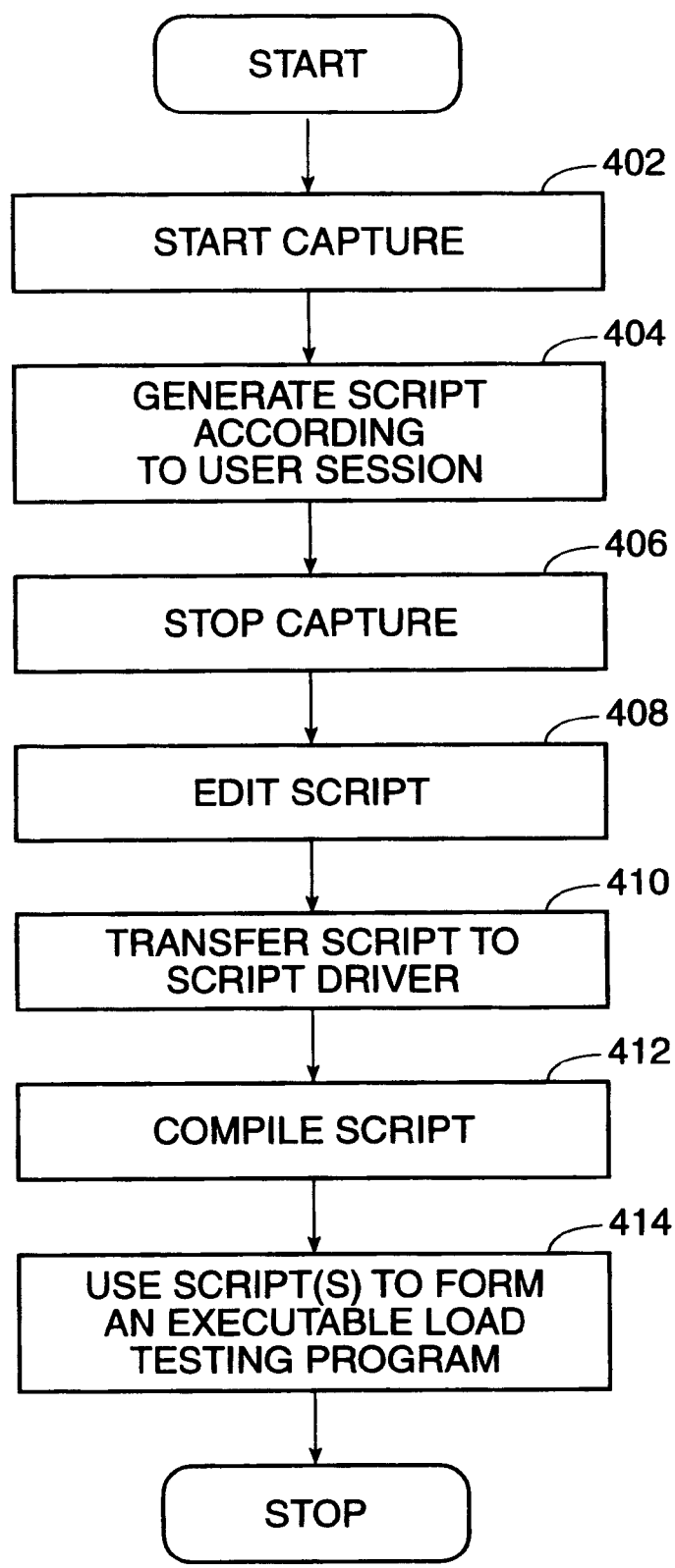
FIG. 8 shows a flowchart of the process of creating an executable load testing program.

FIG. 8 shows a flowchart of the process of creating an executable load testing program. The executable load testing program is the program that operates on the script driver to emulate one or typically many users. The process steps are performed on different computers including the clients and the script drivers. Although these steps may be performed sequentially on a network including the script driver, clients and server. Many of the steps may be performed on different networks, at different locations, and at different times. For example, the generation of scripts does not require the script driver and may be performed on one or numerous client computers. As another example, the scripts are described as being edited on the client but they may be edited, if at all, on any computer that provides script editing capabilities (typically ASCII editing). Therefore, the actual process of executable load testing program will vary according to many factors which will be readily apparent to those of skill in the art.

At step 402, the Capture Agent is initialized on a client computer. The Capture Agent is directed by a program to capture user interface and application calls to generate a script. The Capture Agent generates a script on the client computer according to the user session at step 404. The script may include user interface calls, application calls, and timing information of the calls. The Capture Agent is stopped at step 406. The Capture Agent is an important aspect of the present invention and its operation will be more fully described in reference to FIGS. 9–12.

The script may be edited at step 408. As mentioned previously, the script may be edited to insert program control statements like loops or to alter data so that the data more accurately represents user sessions. Additionally, the script may be edited for any number of reasons. Because the script contains source language statements in preferred embodiments, the script is not only human-readable but provides the power and capabilities of the source language (e.g., the C programming language). Additionally, captured application calls for different applications from different vendors may be translated into the same source language.

After the script is edited, the script is transferred to the script driver at step 410. The script is typically sent over the network to the script driver but may be input into the script driver utilizing other means like floppy disks.

At step 412, the script is compiled on the script driver. Before the script is compiled, it may be run through a script preprocessor that adds source language statements or other information to the script to make it more suitable for compiling. For example, in a preferred embodiment where the source language is the C programming language, the scripts do not contain compiler preprocessor statements like "#include" or keywords like the curly braces "{" and "}". The script preprocessor adds to or otherwise modifies the script so that it is ready to be compiled.

The script or scripts are utilized to form an executable load testing program at step 414. If a single script is to be utilized to emulate a single user session, the script itself represents an executable load testing program for the user. However, typically the load testing program simulates multiple users running different user sessions. A Mix program allows more than one script to be combined to simulate multiple users. The definition of variables for the load testing program like the number of users, the scripts to be utilized for each user and any delays between the execution of scripts may be specified. In a preferred embodiment, the Mix program may be run in a batch mode or interactively.

As an example, a very simple table may be created in a file called "4user.tab" to include the following:

user1, script1
user2, script1
user3, script1
user4, script2

This table specifies that there are four users and that three of the users will be emulated by script1 and one user will be emulated by script2 (where "script1" and "script2" are the compiled script names). Although the compiled scripts may be started interactively either individually or utilizing a table file like 4user.tab, it is oftentimes easier to utilize a batch file.

Multiple batch files may be created that utilize the 4user.tab table file. For example, a batch file may be created that starts all the users specified by the scripts as follows:

use 4user.tab start all wait quit

The first statement directs the Mix program to utilize the 4user.tab table. The next three statements direct the Mix program to start all the scripts in the table and wait for them to finish before quitting.

Another batch file may be created that utilizes the 4user.tab table file which starts three of the users specified by the scripts five seconds apart thirty seconds into the mix session. The batch file would be as follows:

use 4user.tab at 30 start user1 at 35 start user2 at 40 start user4 wait quit

As before, the first statement directs the Mix program to utilize the 4user.tab table. The next three statements specify the number of seconds from the beginning of the mix session when user1, user2 and user4 should be started. Thus, thirty seconds after the mix session begins, user1, user2 and user4 will be started five seconds apart. The wait and quit statements direct the Mix program to wait for the started users to finish before quitting.

The preceding were just a couple simple examples of the power that the Mix program provides. When used interactively, the Mix program allows simple load tests to be quickly initiated. The batch file capability allows more complicated load tests to be created and saved for future use.

Figure 9:
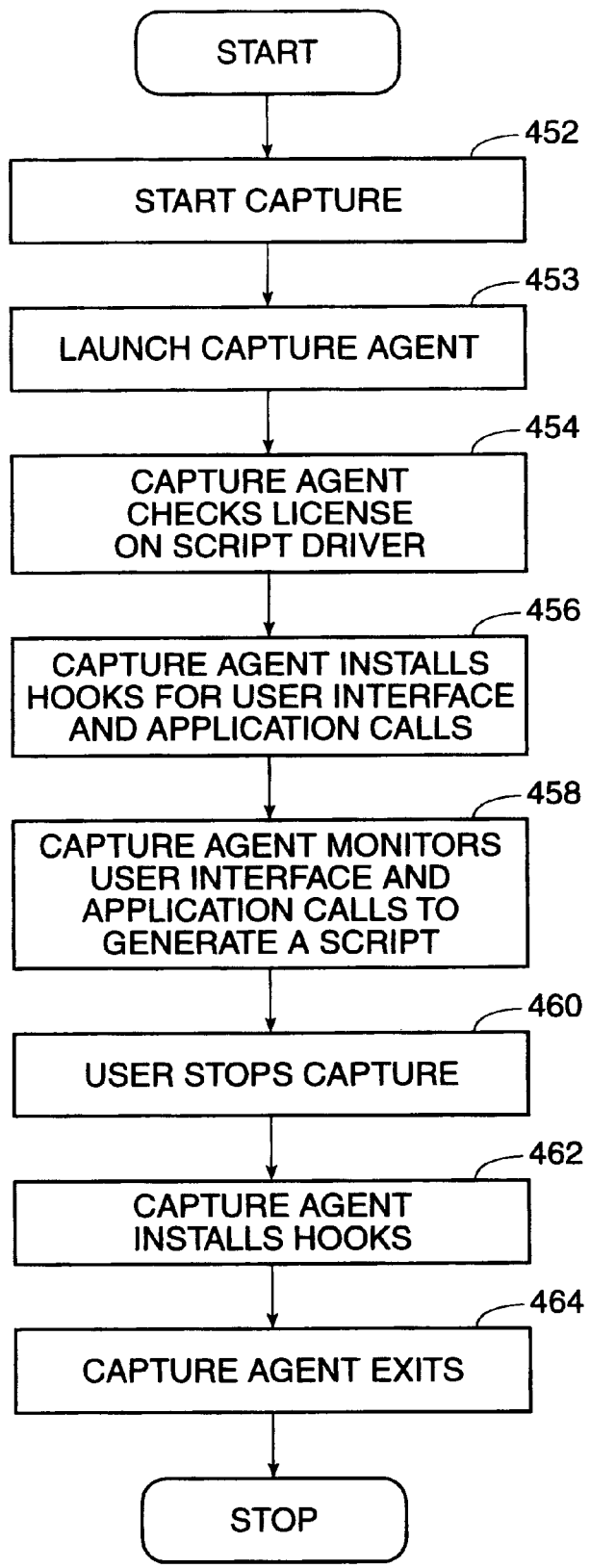
FIG. 9 shows a high level flowchart of the Capture Agent.

FIG. 9 shows a high level flowchart of the Capture Agent. Capture is initiated by a user at step 402 of FIG. 8. For ease of reference, this same step is shown as step 452. After the user starts capture, the Capture Agent is launched at step 453. The Capture Agent is directed by a computer program called the Capture program.

At step 454, the Capture Agent may check the license on the script driver. This step is optional but may be utilized to ensure that the software on the script driver is licensed software. In one embodiment, the script driver software is licensed only for particular computers. The Capture Agent then verifies that the license on the script driver matches the script driver computer. If the license is not verified, the Capture Agent will not proceed.

The Capture Agent installs hooks to capture user interactions and database functions at step 456. Thus, the Capture Agent installs or sets up whatever hooks or interception mechanisms are needed to capture user interface and application calls. The "hook" API call may be utilized to capture Windows API calls and renaming SQL API calls may be utilized to capture SQL API calls. Other mechanisms may be utilized depending on the nature of the computer architecture, operating system, network operating system, and application to be tested.

At step 458, the Capture Agent monitors user interface and application calls to generate a script. The Capture Agent captures or intercepts the calls and timing information of when the calls were sent. In this manner, the generated script is able to reproduce the user session including the timing of the calls. The process of generating the script from the captured user interface and application calls will be described in more detail in reference to FIG. 10.

Capture is stopped by a user at step 406 of FIG. 8. For ease of reference, this same step is shown as step 460. After the user stops capture, the Capture Agent uninstalls the hooks to capture user interactions and database functions at step 462. The hooks are uninstalled so that the client will be more in the condition before the Capture Agent was launched. The Capture Agent exits or ceases to run at step 464.

Figure 10:
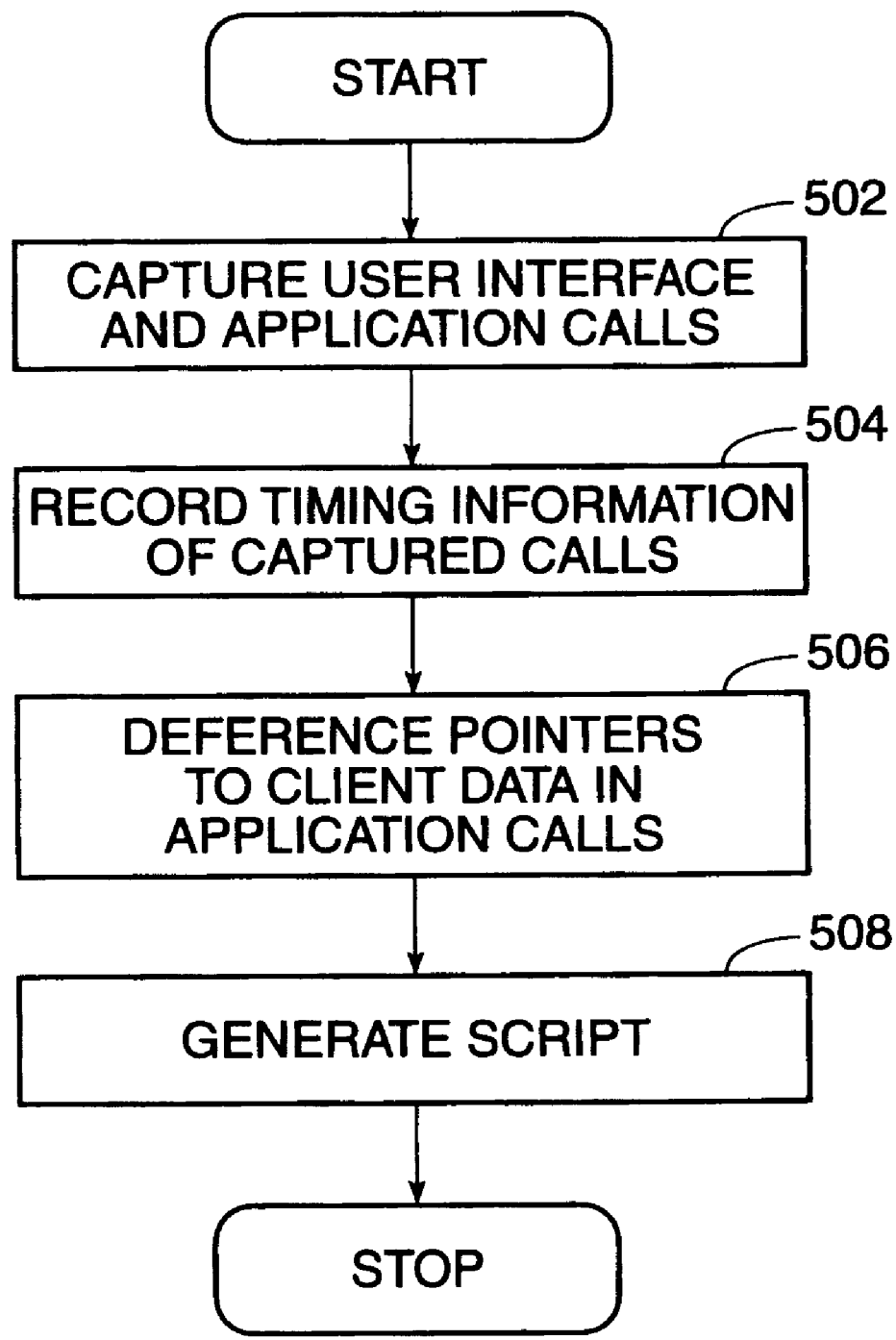
FIG. 10 shows a process the Capture Agent performs to generate a script from the capture calls.

FIG. 10 shows a process the Capture Agent performs to generate a script from the capture calls. At step 502, the user interface and application calls are captured. Timing information regarding when the calls were captured is recorded at 504. The timing information may include or be used to calculate think time for user interface calls and application processing time for application calls.

The term "think time" is used to refer to the time starting when the computer is able to accept input from a user and ending when the user enters (via the enter key or utilizing mouse buttons) commands or data (e.g., an event). For example, if it takes 75 seconds for a user to input information or otherwise produce a Windows API call, then a think time of 75 seconds may be recorded. In a preferred embodiment, the present invention provides many options relating to think time. For example, a uniform think time may be specified at the beginning of the script so that there are less time pressures during a user session that generates a script. Additionally, the Capture Agent may be instructed to only add think times if the think time is longer than a specified amount of time.

The term "application processing time" is used to refer to the time starting when a user interface call is received from the user and ending when the client application responds locally, for example by redrawing a window on the display. The application processing time does not refer to the time that the server takes to process an SQL call. For example, if it takes 0.4 seconds for the client to bring up a window used for fetching data, then a application processing time of 0.4 second may be recorded.

The think and application processing times are utilized to emulate a user session in "non-display mode". In non-display mode, the script driver communicates directly with the server as shown in FIG. 7. Because a client computer is not performing the client application functions, the user input to the client application is not utilized. Instead, the think and application processing times are utilized.

Figure 14:
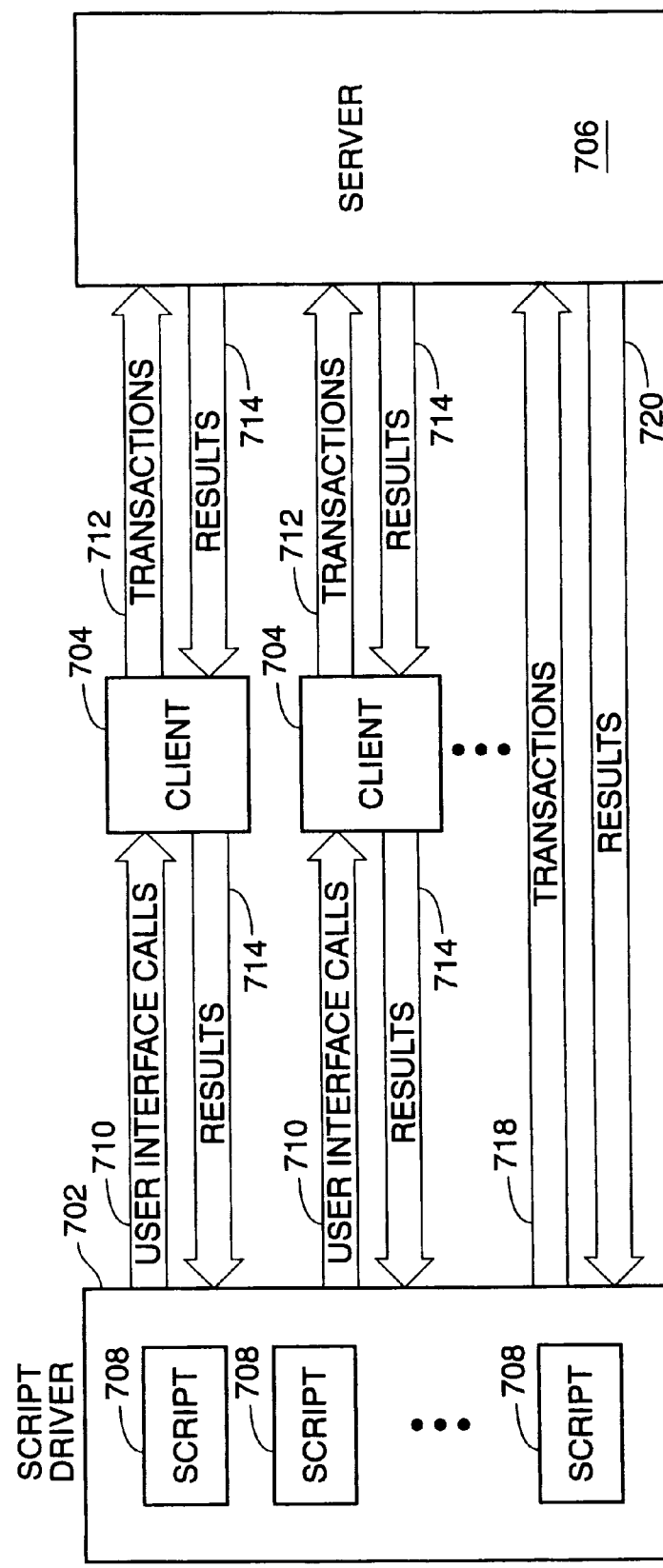
FIG. 14 shows load testing of a system under test suitable for display or non-display mode.

In display mode, at least one client computer accepts the user input to the client application and reproduces the screen displays. This arrangement is shown in FIG. 14. Thus, in display mode, the script driver communicates with the server through a client computer which may be very useful during load testing of a system. Display mode or non-display refers to a single emulated user session or script. Consequently, some scripts may be run in display mode while other scripts are run in non-display mode. Of course, display mode requires that a client be available so the actual number may be limited by the hardware available.

In order to illustrate the effect of display mode and non-display mode on the script, the following script segment will be analyzed:

. . .

Think(2.026);

LeftButtonPress(459, 616);

AppWait(0.22);

-continued

```
WindowRcv("CwPtPt");
. . .
```

The Think statement indicates the user took 2.026 seconds to click on the left mouse button as indicated by the following LeftButtonPress statement. The LeftButtonPress statement indicates that the user pressed the left mouse button at those coordinates. The AppWait statement indicates the client computer took 0.22 seconds to redraw a window as indicated by the following WindowRcv statement. The WindowRcv statement indicates that certain windowing events were taken in response to the LeftButtonPress. The parameters of the WindowRcv function are standard Windows two-letter pneumonics (e.g., "Cw" means create window and "Pt" means paint).

When the above script is run in display mode, the LeftButtonPress command will be sent to a client computer after the indicated think time and the WindowRcv command instructs the script driver to wait until the indicated windowing events occur. As the script is actually driving a client computer and waiting for the client application to perform, the AppWait function is ignored.

When the above script is run in non-display mode, only the Think and AppWait statements are executed. The script driver waits the appropriate times to emulate the user session but the user interface calls and any responses to them are not utilized. All the scripts in FIG. 7 would be run in non-display mode as there is no client to display a script in progress. In FIG. 14, scripts may be run in display and non-display mode as there is at least one client to display a script in progress.

Additionally, the Capture Agent may be instructed to only capture the application calls (e.g., SQL API calls). This may be done to conserve space in the script files. Thus, the above script would not include the LeftButtonPress statement. However, the Think statement would still be present so that the script delays time associated with user input time. The script may then only be run in non-display mode as the user interface calls are not present in the script.

Although a user may physically operate a client computer while generating a script for a user session, the present invention may also be utilized with a GUI tester. A GUI tester is a program that takes over the inputs to an application in order to test it. The Capture Agent may be utilized with a GUI tester so that the GUI tester operates the client application and the Capture Agent generates a script. Thus, the present invention may be used in conjunction with GUI testers and does not require that a user operate the client to generate a script for a user session. Accordingly, the terms "user session", "user interface call" and the like, do not imply that a living user must be operating the client.

Still referring to FIG. 10, pointers in the application calls to client data are dereferenced at step 506. Many application calls include references or pointers to data that is stored locally on the client. The Capture Agent dereferences these pointers (accesses the data referenced) and places the data in the script. For example, the following is a segment including SQL calls:

```
. . .
Open(LOG1, CUR1)
Parse(CUR1, "INSERT INTO CUSTOMERS (ID, FIRST_NAME,
LAST_NAME, ADDRESS_LINE_1, ADDRESS_LINE_2,
ADDRESS_LINE_3, PHONE_NUMBER, FAX_NUMBER,
COMM_PAID_YTD, ACCOUNT_BALANCE, COMMENTS) VALUES
(:id, :fname, :lname, :addr1, :addr2, :addr3, :phno,
:faxno, :cytd, :bal, :comm)");
CSset(CUR1, MAXARRSIZE, 1);
Bind(CUR1, ":id", STRING, 40)
Bind(CUR1, ":fname", STRING, 21);
Bind(CUR1, ":lname", STRING, 21);
Bind(CUR1, ":addr1", STRING, 21);
Bind(CUR1, ":addr2", STRING, 21);
Bind(CUR1, ":addr3", STRING, 21);
Bind(CUR1, ":phno", STRING, 16);
Bind(CUR1, ":faxno", STRING, 16);
Bind(CUR1, ":cytd", STRING, 40);
Bind(CUR1, ":bal", STRING, 40);
Bind(CUR1, ":comm", STRING, 241);
Data(CUR1, "555|John|Smith|123 Elm St.|Anytown, MD
12345|USA|555-555|555-5555|9000|5000|No comments");
Exec(CUR1);
Close(CUR1);
. . .
```

The above script include source language statements in the C programming language. The statements add a new data record John Smith into CUSTOMERS. The statements correspond very closely to actual SQL API calls. However, in actual SQL API calls, the Bind statements may have pointers to the data for John Smith on the client computer (e.g., the Bind statements may have pointers as parameters).

The Capture Agent identifies the pointers, dereferences the pointers to access the data, and automatically generates the Data statement which includes the accessed data. In this way, the script driver is able to replicate the user session without requiring access to the client's memory, which is typically unavailable during load testing. Another advantage is that by dereferencing the pointers and placing the accessed data in the script, the script may be more easily edited so that each copy of the script will add different customers to the database when run. This may be done by filling in the data statement from a file or using some kind of random data.

At step 508, the script is generated. The script may be generated during and after a user session. In other words, the script may be generated at the end of a captured user session, during the captured user session, or both. The script is typically saved onto the hard drive of the client computer.

Figure 11:
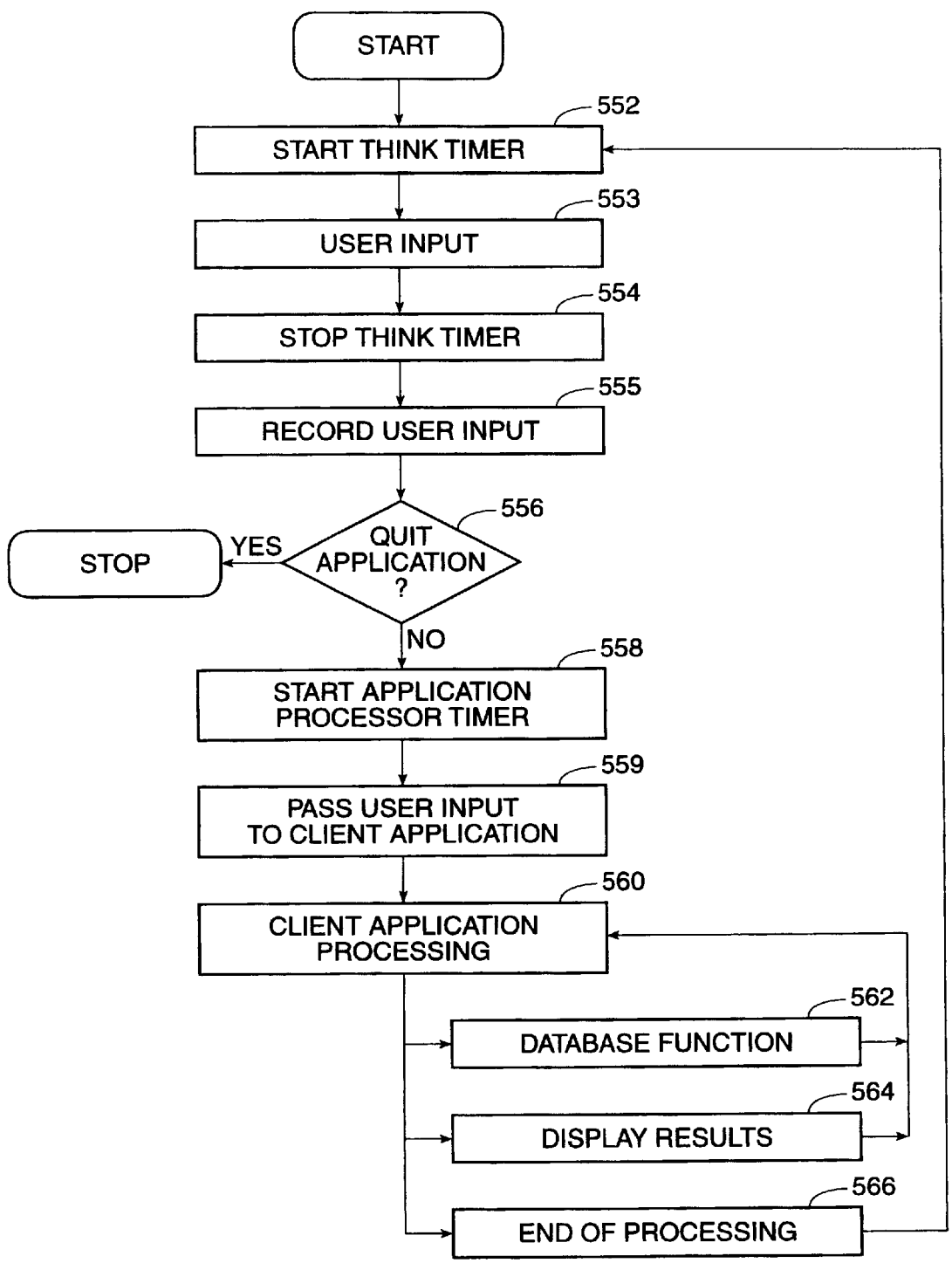
FIG. 11 is a typical captured database session.

FIG. 11 is a typical captured database session. Once the client application of the database application is running on the client, a Think timer is started at step 552. The user inputs data at step 553 until a terminating character (e.g., the enter key) or action (e.g., clicking a mouse button) has been taken.

After the user is finished inputting data, the Think timer is stopped at 554. The user input in the associated user interface call is recorded at step 555. If the user input indicates the user wants to quit the application at step 556, the application terminates. Otherwise, an Application Processing timer is started at step 558.

At step 559, the user input in the form of the user interface call is sent to the client application. Once the client application receives the user interface call, the application performs whatever processing is required at step 560. For example, the user interface call may specify to perform a database function as shown in step 562 or to display results in step 564. The database function typically requires the client application to send a request to the server via the network. The processing of a database function will be described in more detail in reference to FIG. 12.

The client application continues to process the user interface call until all the processing has been done. The processing has been completed at step 566.

Figure 12:
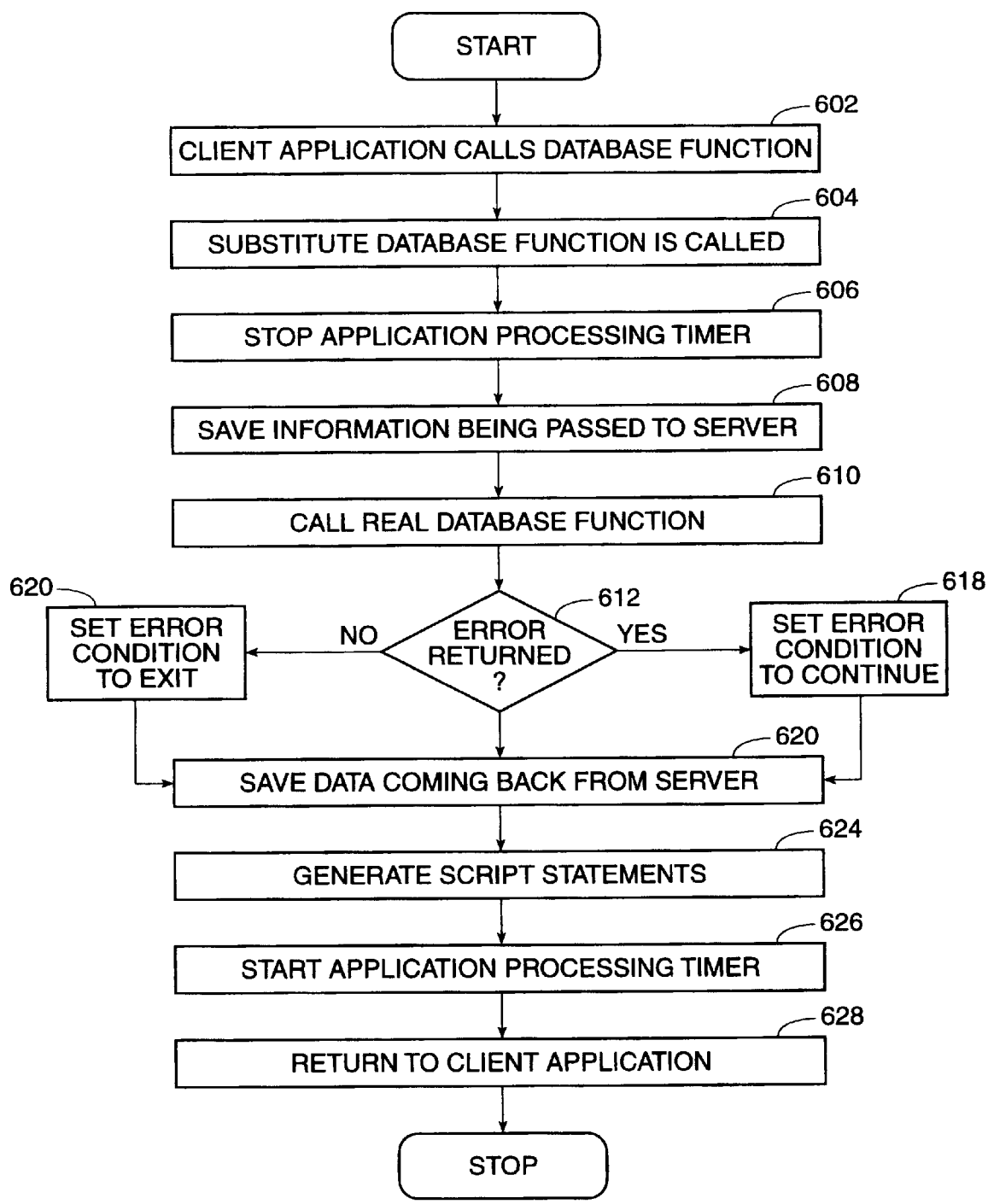
FIG. 12 shows processing of a database function.

FIG. 12 shows processing of a database function. At step 602, the client application calls a database function (i.e., an application call). In a preferred embodiment, the database function is in the form of an SQL API call and the database function calls a substitute database function so that the Capture Agent can capture or intercept the call. The substitute database function is called at step 604.

The Application Processing timer is stopped at step 606. Information being sent to the database server in the database function is saved at step 608. The information includes the database call and any data that is referenced through pointers in the call. At step 610, the real database function is called.

At step 612, a determination is made as to whether the database function resulted in an error from the server. For example, the error may be cause by an incorrect or ill-formed database function call. However, when capturing a user session, a user may generate an error. In order to reproduce the user session, the script should also do the same actions to generate the error. These errors though are expected so the script sets an error condition (e.g., a flag) to CONTINUE at step 618. When the script later encounters this error during execution, the script will check the error condition to see if it is set to CONTINUE. If the error condition is set to CONTINUE, the script knows that the error was expected and continues.

If the database function did not result in an error from the server, the error condition is set to EXIT at step 620 which instructs the script to exit if it encounters an error because it is unexpected. The error condition does not have to be set for each database function but may only be set when the error condition needs to be changed. Typically, most database functions will not generate an error so the error condition will usually be set to EXIT. The script will then exit when an unexpected error occurs during script execution.

At step 622, data coming back from the database server (e.g., results) are saved. Script statements are then generated at step 624. Once the script statements are generated, the Application Processing timer is started at step 626 and control is returned to the client application at step 628.

Figure 13:
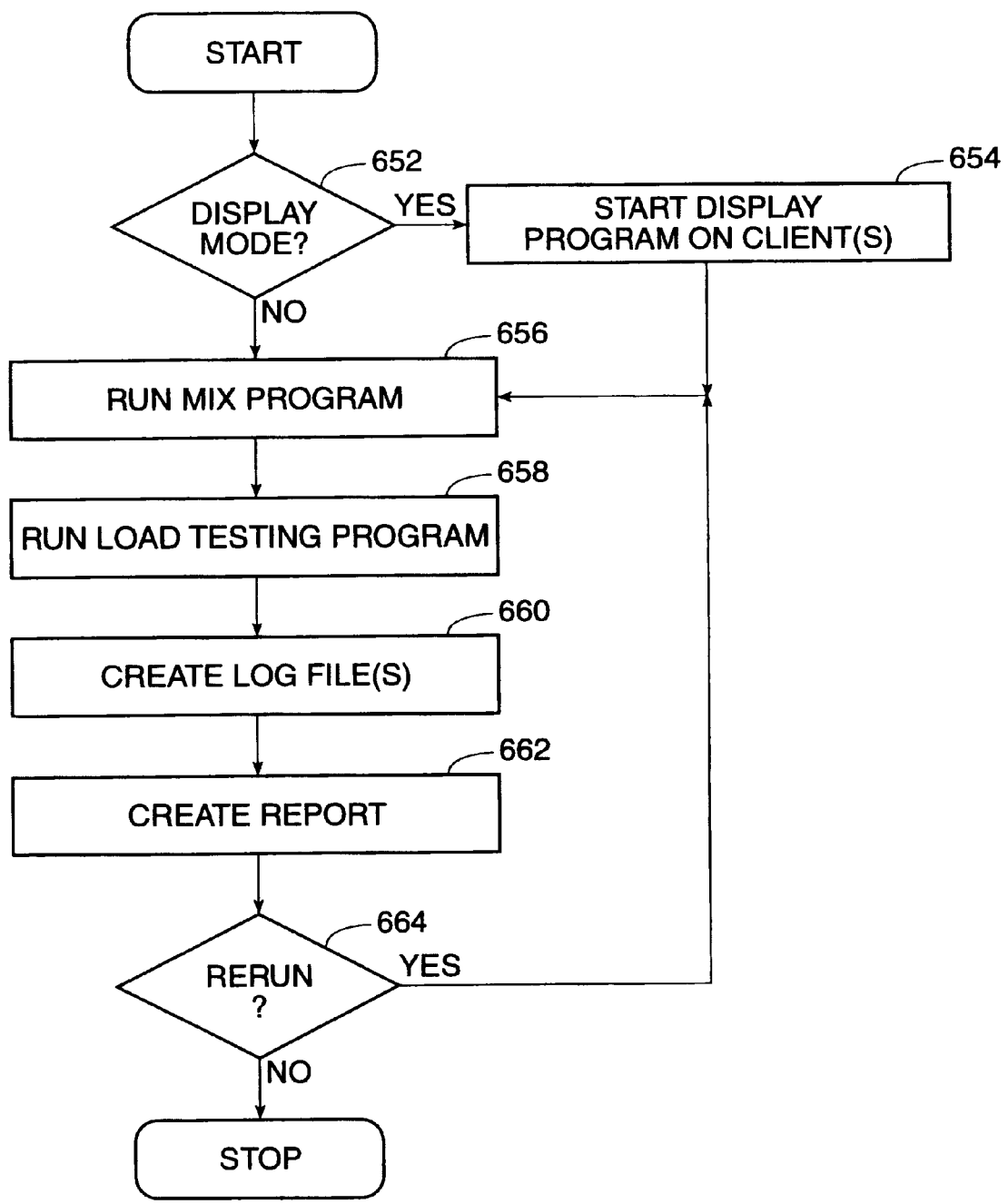
FIG. 13 shows a flowchart of performing load testing.

FIG. 13 shows a flowchart of performing load testing. The flowchart assumes that there are already compiled scripts resident on the script server. At step 652, a determination is made whether the load test should be performed in display mode. In order for the load test to be performed in display mode, there should be at least one client computer on the network as shown in FIG. 14. For each client that will display the script in progress, a Display program is started on the client at step 654.

The Display program is designed to accept input from the script driver to simulate a live user. The input is generated by the script and was typically captured from a previous user session.

At step 656, the Mix program is run. The Mix program allows, either interactively or in batch files, more than one script to be executed on the script driver. The Mix program is optional but is typically run to simulate multiple users interacting with the server. A flag or parameter is set for each script that will be executed in display mode so that the script driver sends the appropriate inputs to the client.

The load testing program is run at step 658. Each script that executes on the script driver creates a log file at step 660. At step 662, a report may be generated from the log files which includes information such as server response time and system throughput. In a preferred embodiment, the log files are ASCII files on the server so that third party statistical and graphics programs may be utilized to create custom reports.

At step 664, a determination may be made whether to rerun another load test. For simplicity, the flowchart shows a return to step 656 to run the Mix program and possibly select a different set of users, number of users, user start times, and the like. However, this should not imply that a return to many of the other steps is not possible. For example, a different client may be selected to run the display program at step 654 or a new user session may be captured on the client at step 402 of FIG. 8.

FIG. 14 shows load testing of a system under test suitable for display or non-display mode. A script driver 702, clients 704 and a server 706 are connected by a network. The script driver may store multiple compiled scripts 708. Scripts that are run in display mode send user interface calls 710 to one of the clients 704. The clients then display the screen displays that occur during the emulated user session and also send transactions 712 to the server. The server sends results 714 to the clients in response to transactions 712. The clients 704 forward results 714 to the script driver.

Scripts that are run in non-display mode send transactions 718 directly to the server. The server sends results 720 to the script driver in response to transactions 718. Transactions 712 and 718 do not differ except for the source of origin of the transactions being the script driver or clients, respectively.

Figure 15:
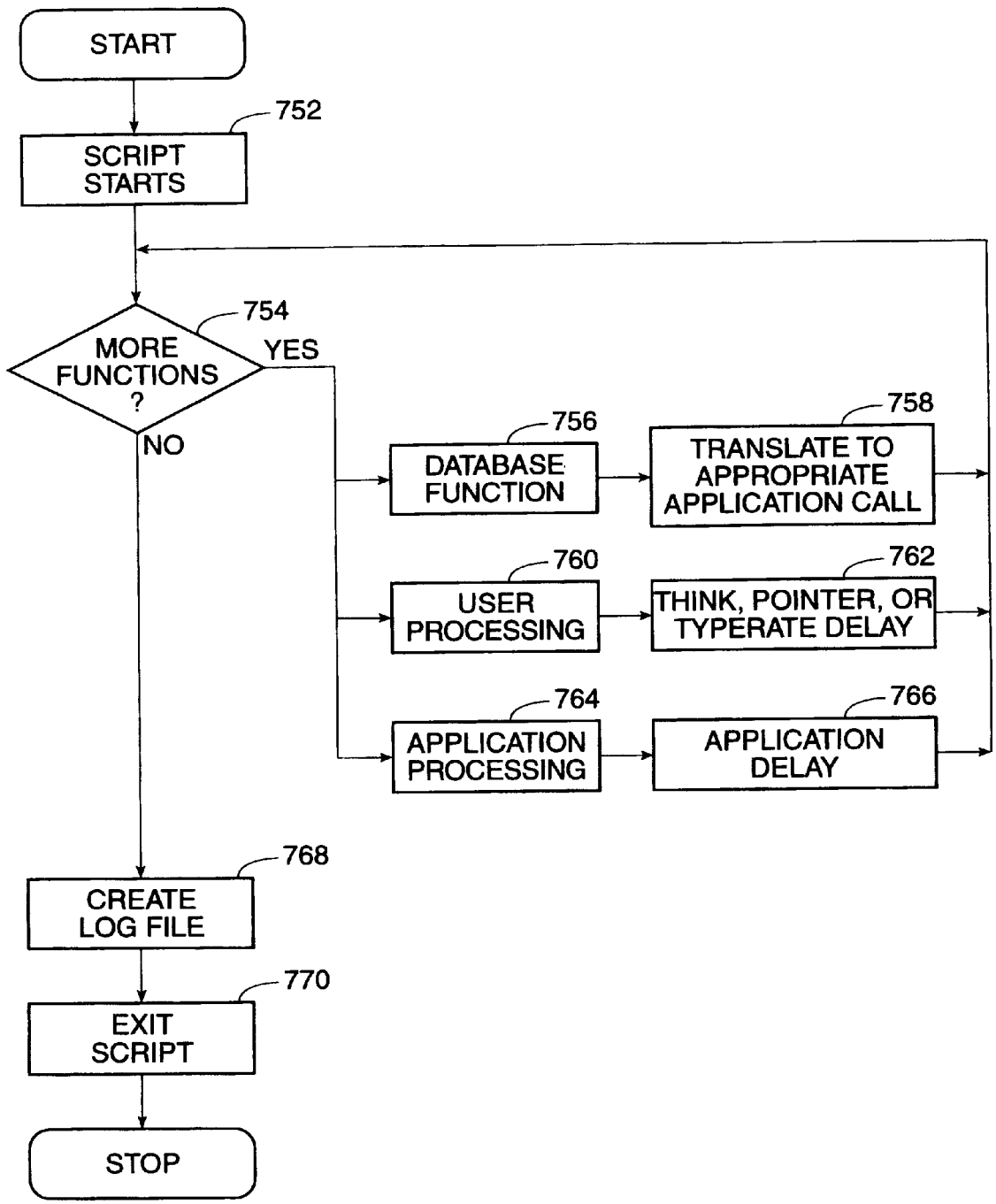
FIG. 15 shows a flowchart of a process of emulating a user session from a script.

FIG. 15 shows a flowchart of a process of emulating a user session from a script. The scripts execute on the script driver with each script representing a user session that was typically captured by the Capture Agent. In a preferred embodiment, the scripts are compiled and include source language statements so the execution of a script is the execution of a computer program. The scripts may contain different control statements including loops and branches so there is no "one" process flow of a script. The script process in FIG. 15 is presented to illustrate a simple script.

At step 752, the script starts and begins executing the compiled source language statements. If there are more functions or statements at step 754, the functions are executed.

A database function is specified at step 756. The database function is translated into the appropriate application call (e.g., SQL API call) at step 758, which is sent to the server via a network transport layer.

User processing is specified at step 760. The user processing may include Think delays, Pointer (e.g., mouse) delays or Typerate (speed of typing) delays. The script may have any of these delays globally defined at the beginning of the script. If the script is executed in display mode, the specified user interface call or calls will also be executed or sent at step 762 after the delays.

Application processing is specified at step 764. An application processing delay (e.g., AppWait) will be performed at step 766 if the script is executed in non-display mode. If the script is executed in display mode, the script will wait for the client to return from generating the window displays.

Once all the functions or statements in the script have been executed, the script creates a log file at step 768. The log file may be created and written to as the script executes but the step is shown at the end for simplicity. After the log file has been created, the script exits at step 770.

Appendix 1 includes source code for a computer software product that includes the Capture Agent that captures user interface and application calls as well as other aspects of the present invention. Appendix 2 is a script development guide. Appendix 3 is a multi-user testing guide. Appendix 4 is a reference guide as well as other related materials.

The above description is illustrative and not restrictive. Many variations of the invention will become apparent to those of skill in the art upon review of this disclosure. Merely by way of example the invention is illustrated with regard to database applications, but the invention is not so limited. The scope of the invention should, therefore, be determined not with reference to the above description, but instead should be determined with reference to the appended claims along with their full scope of equivalents.

What is claimed is:

1. In a computer system having a server computer and a client computer, a method of producing scripts for load testing a software application, comprising the steps of:
   capturing application calls on the client computer, the application calls including application calls generation by the software application in response to user interactions;
   recording timing information of the captured application calls; and
   generating a script from the captured application calls that generates application calls according to the timing information of the captured application calls.

2. The method of claim 1, further comprising setting a timer to determine timing information of the captured application calls.

3. The method of claim 1, further comprising the steps of:
   capturing user interface calls on the client computer;
   recording timing information of the captured user interface calls; and
   generating the script from the captured user interface calls that generates user interface calls according to the timing information of the captured user interface calls.

4. The method of claim 3, further comprising setting a timer to determine timing information of the captured user interface calls.

5. The method of claim 3, wherein the captured user interface calls are graphical API calls.

6. The method of claim 1, further comprising the step of setting a flag in the script if an error is generated during script generation.

7. The method of claim 6, further comprising the step of ignoring an error generated during script execution if the flag indicates the script was also generated during script generation.

8. The method of claim 1, further comprising the step of executing a plurality of scripts to emulate a plurality of users.

9. The method of claim 1, further comprising the step of creating a report of response times of the server computer.

10. The method of claim 1, wherein the captured application calls are SQL API calls.

11. A computer program that produces scripts for load testing a software application, comprising:
    computer readable code that captures application calls on a client computer, the application calls including application calls generated by the software application in response to user interactions;
    computer readable code that records timing information of the captured application calls; and
    computer readable code that generates a script from the captured application calls that generates application calls according to the timing information of the captured application calls;
    wherein the computer readable codes are stored on a tangible medium.

12. In a computer system having a server computer and a client computer, a method of producing scripts for load testing a software application, comprising the steps of:
    capturing application calls on the client computer, the captured application calls including references to data stored locally on the client computer;
    identifying in the captured application calls references to data stored locally on the client computer;
    accessing the data through the references in the captured application calls; and
    generating a script from the captured application calls that generates application calls that include the accessed data in place of the references in the captured application calls, the script including the accessed data.

13. The method of claim 12, wherein the references in the captured application calls are pointers.

14. The method of claim 12, wherein the captured application calls are SQL API calls.

15. The method of claim 12, wherein the script includes source language statements.

16. The method of claim 15, further comprising the step of user editing the script.

17. The method of claim 15, further comprising the step of compiling the script into an executable load test program.

18. The method of claim 12, further comprising the step load testing a system utilizing a plurality of scripts.

19. A computer program that produces scripts for load testing a software application, comprising:
    computer readable code that captures application calls on the client computer, the captured application calls including references to data stored locally on the client computer;
    computer readable code that identifies in the captured application calls references to data stored locally on the client computer;
    computer readable code that accesses the data through the references in the captured application calls; and
    computer readable code that generates a script from the captured application calls that generates application calls that include the accessed data in place of the references in the captured application calls, the script including the accessed data;
    wherein the computer readable codes are stored on a tangible medium.

20. In a computer system having a server computer and a client computer, a method of producing scripts for load testing a software application, comprising the steps of:
    capturing application calls on the client computer, the captured application calls specifying information to be sent to the server computer;
    translating the captured application calls into source language statements; and
    generating a script including the source language statements that generates application calls.

21. The method of claim 20, further comprising the step of translating captured application calls for different applications into a same source language.

22. The method of claim 20, further comprising the step of capturing user interface calls on the client computer.

23. The method of claim 22, further comprising the step of translating the captured user interface calls into source language statements.

24. The method of claim 23, wherein the script generates user interface calls.

25. The method of claim 20, wherein the source language statements are in the C programming language.

26. A computer program that produces scripts for load testing a software application, comprising:

computer readable code that captures application calls on the client computer, the captured application calls specifying information to be sent to the server computer;

computer readable code that translates the captured application calls into source language statements; and computer readable code that generates a script including the source language statements that generates application calls;

wherein the computer readable codes are stored on a tangible medium.

27. In a networked computer system having a first computer (script driver) and a second computer (system under test), a method of load testing a software application, comprising the steps of:

the first computer executing scripts that emulate a plurality of users, the scripts including delays representative of actual user sessions;

the first computer sending application calls to the second computer over a network;

the second computer responding to the application calls over the network; and measuring response times of the second computer.

28. The method of claim 27, further comprising the step of a third computer on the network displaying a script directed user session in progress.

29. The method of claim 27, further comprising the step of selecting a display mode where a third computer on the network displays a script directed user session in progress.

30. The method of claim 27, wherein the delays include think times and application processing time.

* * * * *